Feb. 2, 1937. E. J. RUEB 2,069,463

STORAGE BATTERY GRID

Filed May 25, 1934

INVENTOR.

Earl J. Rueb

BY *Lancaster, Allwine and Rommel*

ATTORNEYS.

Patented Feb. 2, 1937

2,069,463

UNITED STATES PATENT OFFICE 2,069,463

STORAGE BATTERY GRID

Earl J. Rueb, Oklahoma City, Okla.

Application May 25, 1934, Serial No. 727,510

5 Claims. (Cl. 136—49)

This invention relates to storage batteries, and more particularly to a grid therefor.

The principal object of the invention is to provide a grid which may be employed to form a plate taking the place of two conventional plates, thus reducing the number of plates and separators making up the storage battery.

Another important object is to provide a novel grid which may be employed to form a storage battery plate provided with vertically disposed gas passageways so that the separators employed need not be grooved at all and, consequently, may be considerably thinner than conventional separators.

Yet another object is to provide a grid which may be used to form a new type of storage battery plate, presenting a decidedly larger surface of active material to the electrolyte.

Another object is to provide such a grid from which the active material will not be apt to drop nor become dislodged.

Other objects and advantages of the invention will be apparent during the course of the following detailed description, taken in connection with the accompanying drawing forming a part of this specification and in which drawing:—

Figure 1:
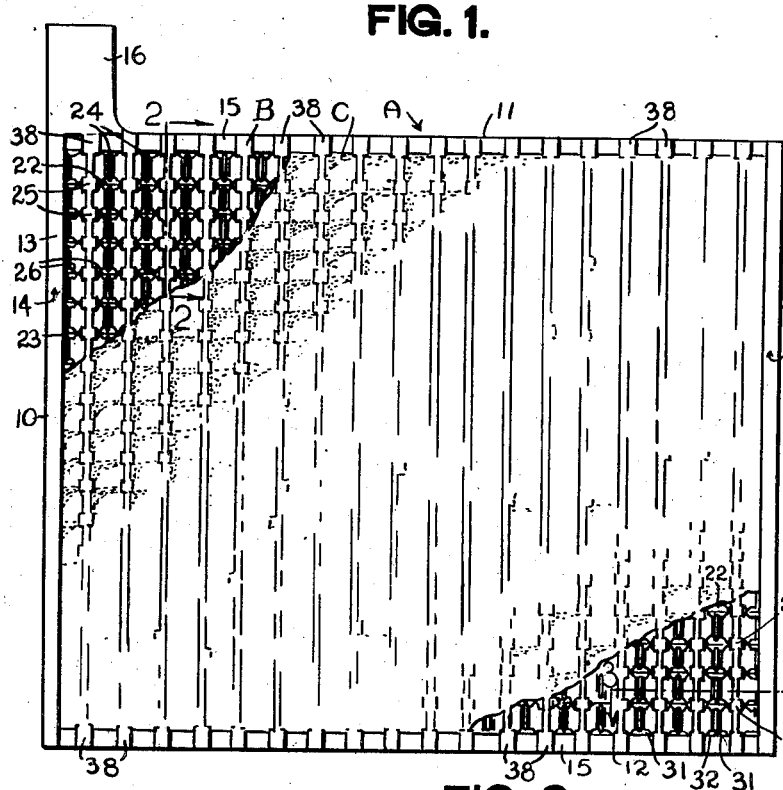
Figure 1 is an elevation of a storage battery plate including the novel grid, part of the active material being removed in order to better illustrate portions of the construction.

In the drawing, wherein for the purpose of illustration is shown only a preferred embodiment of the invention, the letter A designates generally the completed battery plate, the letter B the novel grid thereof, the letter C active material thereon, and the letter D a battery plate separator.

The completed battery plate A is of conventional shape but is seen to possess novel characteristics which, in part, comprise a plurality of vertical grooves or channels with the surface of each channel being curved into a plurality of concavities extending longitudinally of the channels. As for the grid B, the same includes a pair of spaced apart upright end support members 10 and a pair of spaced apart substantially horizontal top and bottom support members 11 and 12 forming an integral rectangular frame 13. It will be noted, in comparing the bottom support member 12, shown in Figure 3, and the top support member 11, shown in Figure 2, with the end support member 10, shown in Figure 3, that the former two are much narrower than the latter, so that the end support members 10 extend outwardly beyond the sides of the support members 11 and 12, with the planes of the opposite end faces 14 of the end support members 10 disposed outwardly of the planes of the opposite faces 15 of the support members 11 and 12. Carried, preferably by the support member 11 at one end thereof, is a conventional upwardly extending lug 16, ordinarily employed as a connection between the grid and a conventional post strap (not shown).

Preferably integral with the support members 10, 11 and 12 are a plurality of rows 20 and 21 of spaced apart tongues or shelves 22, 23 and 24, of novel construction. These rows 20 and 21 may extend substantially horizontally across the frame 13 and are connected with the end support members 10. From Figure 3, it will be seen that a row 20 joins a row 21 and this is preferably common to all the rows except those containing the tongues 24.

Figure 2:
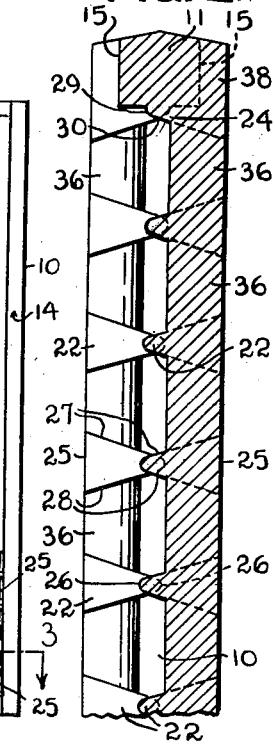
Figures 2 and 3 are enlarged fragmentary sections substantially upon their respective lines in Figure 1.
Figure 3:
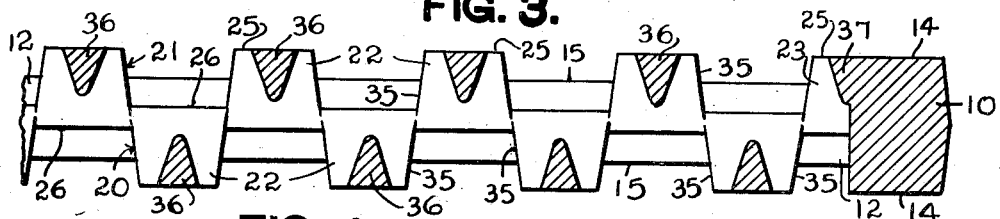

Now for the tongues 22 and 23, all of these in each row 20 extend from one face or mouth of the frame 13 towards the opposite face or mouth. In other words, the rear edge 25 of each tongue 22 or 23 is disposed on preferably the extended plane of one end face 14 and each tongue extends from its rear edge 25 towards the opposite mouth of the frame. However, the length of each tongue 20 is slightly more than one-half the distance between the end faces 14 of each end support member 10, so that the forward edge 26 of each tongue 22 or 23 extends beyond the center of the frame. This is shown in Figures 2 and 3.

What has been said of the tongues 22 and 23 of rows 20 applies as well to all the tongues 22 and 23 of all the rows 21 but these, of course, extend, with their rear edges 25 disposed preferably on the extended plane of the other of said end faces 14.

Each of the tongues 22 which are in the majority and constitute the important tongues of the assembly, is decidedly wedge-shaped in cross section, with the upper surface 27 of each tongue 22 extending upwardly at a slight angle from the forward edge 26 and with the lower surface 28 of the tongue extending downwardly, at substantially the same angle, from the forward edge 26.

Since the tongues 24 project from the top and bottom support members 11 and 12, they are slightly unlike the tongues 22 and 23 in cross section, those depending from the top support member 11, sloping downwardly from their forward edges 29 and have no upper surface, but have a lower surface or face 30. Those tongues 24, extending from the lower support member 12, have an upper surface 31 extending upwardly, at a slight angle, from their forward edges 32 to their rear edges, as is apparent. An angle of from 14° to 18° from the horizontal for these surfaces is found very satisfactory for the purposes sought to be accomplished and the surfaces mentioned need not be corrugated and, in fact, are preferably substantially smooth.

With reference to the general shape of the tongues 22, the rear edges 25 of these tongues are narrower in length than the length of their forward edges 26, so that the top or bottom plan view, or horizontal section, as the case may be, reveals a substantially isosceles trapezoidal shape for these tongues. This permits the tongues 22 of each row 20 to join the end edges of the adjacent tongues 22 of each row 21 and, consequently, each tongue in each row 20 is staggered with relation to its adjacent tongue in the opposite row 21. This connection of the tongues in opposite rows to each other adjacent their forward edges provides a very stable structure and aids greatly in preventing buckling of the plate yet permits the elimination of considerable lead in the grid structure.

The tongues 23 may be regarded as half tongues in top plan view, as is apparent from Figure 3, and aid in continuing the vertical channels, gradually narrowing in depth, formed by the side edges 35 of the several adjacent tongues.

Extending from tongue to tongue 22 or 24 and the top and bottom support members 11 and 12 are vertical supports or spacers 36, wedge-shaped in cross section, as shown in Figure 3, with the point of the wedge extending towards the forward edges of the several tongues. These supports 36 preferably have their wider ends flush with the rear edges of the several tongues 22 and 24. These supports may be continued, as shown at 37, in Figure 3, as a part of the end support members 10, for assisting in the support and spacing of the half tongues 23. Not only do the members 36 and 37 serve as supports and spacers but they also assist in the correct spreading of the active material upon the grid and aid in retaining the material in place when spread. These supports 36 terminate at the top and bottom support members 11 and 12 in spaced apart lugs 38 upon the faces 15 of these members 11 and 12, the depth of the lugs being such that their forward faces are in substantially the same plane as the rear edges 25 of the tongues 22. Thus, spacers D, being in contact with the faces 14 of the end support members 10, will not be able to buckle and extend with their bottom and top edges in contact with the top and bottom support members 11 and 12 but will contact, instead, the forward faces of the lugs 38. Consequently, there is a free passageway between each pair of adjacent lugs 38.

Figure 4:
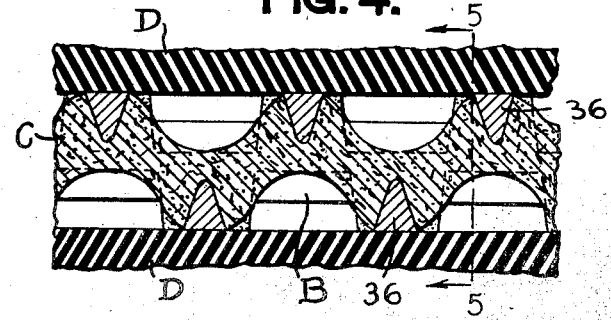
Figure 4 is an enlarged fragmentary horizontal section thru a dipped storage battery plate employing the novel grid.

The construction of the grid is such that the active material is not wedged in place, for such is not necessary when one considers the integral mass of active material extending from one face of the grid to the other face, as shown in Figure 4.

Figure 5:
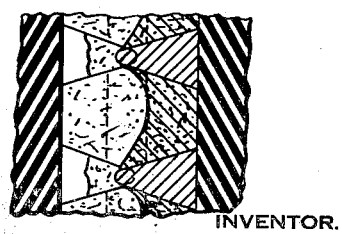
Figure 5 is an enlarged fragmentary vertical section thru the same on the line 5—5 of Figure 4.

The shape and disposition of the adjacent tongues, as disposed one above the other, is such that the active material takes the vertically channeled form shown in Figure 4, while the disposition of the tongues of adjacent rows 20 or 21 causes the material to take the concaved form shown in Figure 5, whereby a plurality of concavities extend longitudinally of the channels, greatly increasing the area of the active material in contact with the electrolyte. However, it should be borne in mind that these channels are not merely to increase the surface area but are to provide gas passageways which extend from the very top of the grid (including the top supporting member 11) to the very bottom (including the bottom supporting member 12).

The wedge shape of the tongues, when taken into consideration with their staggered thicker ends 25, affords a particularly strong grid structure, not apt to yield to buckling forces.

In applying suitable active material to the novel grid disclosed, the grid is dipped, by approximately a vertical movement, into the active material with the support members 12 of the grid lowermost and then withdrawn, altho it may be desirable to oscillate the grid somewhat while immersed. When removed, it will be found that the active material, in conjunction with the grid, forms a plurality of grooves or channels on both sides of the plate, substantially as shown in Figure 4, while it also forms the plurality of concavities within the grooves or channels, as shown in Figure 5, with the material of less bulk immediately below the tongues than directly upon them.

The active material will not drip nor fall from the grid, either before being formed in the conventional weak sulphuric acid bath or after being treated therein. Care should be taken, however, not to unduly agitate the bath, for if unduly agitated, the binder prevents mixing of the acid.

When the treated plates are dried sufficiently, they may be assembled as is well known in the art and if they are to be incorporated into a complete battery, the best result is achieved by the use of sulphuric acid having a specific gravity of from 1.200 to 1.250 used in the battery cells. The battery is then placed on the charging line at ordinary charging rates, i. e., one and one-half to two amperes per positive plate, and as soon as charged the gravity can be raised to the desired strength and the batteries may then be put upon the market unless it is desired to cycle them first. Care must be taken during the first six or eight hours of charging, as the plates thus formed have exceptionally good circulation. It has been found desirable to turn off the charging and let the battery stand over night, or about twelve to fourteen hours, then the charging rate can continue at a higher rate, say three amperes to each positive plate for eight to twelve hours longer, this usually completing the formation.

The construction of the tongued grid, taken with the method of applying the active material to the grid, is such that the active material will not bridge across from tongue to tongue of the same row, but a continuous channel or groove will be provided.

Various changes may be made to the form of the invention shown herein, and to the steps in the method, without departing from the spirit of the invention or the scope of the claims.

What is claimed is:

1. In a grid for storage battery plates, an open frame, and two sets of substantially vertical rows of spaced-apart tongues bridging said open frame, one set of said rows containing tongues which project in one direction and the other set of said rows containing tongues which project in the opposite direction and are staggered with relation to the tongues of said first-named set of the rows, the majority of said tongues being wedge-shaped in vertical section and substantially isosceles trapezoidal-shaped in horizontal section.

2. As an article of manufacture, a grid for storage battery plates, comprising an open frame having end supports and top and bottom supports joined thereto, each of said supports having paralleling side faces with the planes of said side faces of said top and bottom supports lying inwardly of the planes of said other faces, and two sets of substantially horizontal rows of spaced apart tongues bridging said frame, one set of said rows containing tongues which project in one direction and the other set of said rows containing tongues which project in the opposite direction, the majority of said tongues being substantially isosceles trapezoidal-shaped in horizontal section, whereby there is provided a shorter edge and a longer edge paralleling said shorter edge, the longer edges of all of said tongues falling short of the planes of said faces of the end supports, and the shorter edges of all of said tongues extending beyond the planes of said faces of the top and bottom supports.

3. In a grid for storage battery plates, an open frame having side faces, and a plurality of vertical rows of spaced apart tongues bridging said frame, each tongue of the majority of said tongues forming, in horizontal section, substantially an isosceles trapezoid, the longer of the two paralleling sides of said isosceles trapezoid being spaced well inwardly of the planes of said side faces and defining an edge of one of said tongues.

4. As an article of manufacture, a grid for storage battery plates, comprising an open frame having end supports and top and bottom supports joined thereto, each of said supports having paralleling side faces with the planes of said side faces of said top and bottom supports lying inwardly of the planes of said side faces of said end supports, spaced apart spacer members extending from said top support to said bottom support, said spacer members being substantially wedge-shaped in horizontal cross section, whereby there are provided by each of said spacer members two diverging faces and a face joining said diverging faces, and two sets of substantially horizontal rows of spaced apart tongues bridging said frame and connected to said support members, one set of said rows containing tongues which project in one direction and the other set of said rows containing tongues which project in the opposite direction, the majority of said tongues being substantially isosceles trapezoidal-shaped in horizontal section, whereby there are provided at least two edges to each of said tongues, one edge being shorter than the opposite edge, the shorter edge lying substantially flush with said side faces of said end supports.

5. In a grid for storage battery plates, an open frame having side faces, and a plurality of vertical rows of spaced apart tongues bridging said frame, each tongue of the majority of said tongues forming, in horizontal section, substantially an isosceles trapezoid, the longer of the two paralleling sides of said isosceles trapezoid being spaced well inwardly of the planes of said side faces and defining an edge of one of said tongues, the tongues in one vertical row being joined to the tongues in the next adjacent vertical row adjacent said longer paralleling side.

EARL J. RUEB.